United States Patent
Black et al.

(10) Patent No.: US 10,178,560 B2
(45) Date of Patent: Jan. 8, 2019

(54) METHODS AND SYSTEMS FOR COMMUNICATION WITH BEAMFORMING ANTENNAS

(71) Applicant: Searete LLC, Bellevue, WA (US)

(72) Inventors: Eric J. Black, Bothell, WA (US); Brian Mark Deutsch, Snoqualmie, WA (US); Russell J. Hannigan, Sammamish, WA (US); Alexander Remley Katko, Bellevue, WA (US); Melroy Machado, Seattle, WA (US); Jay Howard McCandless, Alpine, CA (US); Yaroslav A. Urzhumov, Bellevue, WA (US)

(73) Assignee: The Invention Science Fund I LLC

( * ) Notice: Subject to any disclaimer, the term of this patent is extended or adjusted under 35 U.S.C. 154(b) by 55 days.

(21) Appl. No.: 15/183,291

(22) Filed: Jun. 15, 2016

(65) Prior Publication Data
US 2016/0373181 A1    Dec. 22, 2016

Related U.S. Application Data

(60) Provisional application No. 62/175,933, filed on Jun. 15, 2015.

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0413* (2013.01); *H04B 7/0617* (2013.01);
(Continued)

(58) Field of Classification Search
CPC ...... H04B 7/024; H04B 7/0408; H04B 7/043; H04B 7/0495; H04B 7/0617; H04B 7/0695; H04W 16/28; H04W 28/08
(Continued)

(56) References Cited

U.S. PATENT DOCUMENTS

| | | | |
|---|---|---|---|
| 3,388,396 A | 6/1968 | Rope et al. | |
| 3,604,012 A | 9/1971 | Lindley | |

(Continued)

FOREIGN PATENT DOCUMENTS

| | | | |
|---|---|---|---|
| CN | 103222109 A | 7/2013 | |
| JP | 52-13751 A | 2/1977 | |

(Continued)

OTHER PUBLICATIONS

Supplementary European Search Report, Pursuant to Rule 62 EPC; App. No. EP 14 87 2595; dated Jul. 3, 2017; pp. 1-16.
(Continued)

*Primary Examiner* — Simon Nguyen

(57) ABSTRACT

Holographic beamforming antennas may be utilized for adaptive routing within communications networks, such as wireless backhaul networks. Holographic beamforming antennas may be further utilized for discovering and/or addressing nodes in a communication network with steerable, high-directivity beams. Holographic beamforming antennas may be further utilized for extending the range of communications nodes and providing bandwidth assistance to adjacent nodes via dynamic adjacent cell assist. In some approaches, MIMO is used in concert with holographic beamforming for additional channel capacity.

39 Claims, 6 Drawing Sheets

(51) Int. Cl.
*H04B 7/0413* (2017.01)
*H04W 48/16* (2009.01)
*H04W 16/06* (2009.01)

(52) U.S. Cl.
CPC .......... *H04B 7/0695* (2013.01); *H04W 48/16* (2013.01); *H04W 16/06* (2013.01)

(58) Field of Classification Search
USPC ........................................................ 455/453
See application file for complete search history.

(56) References Cited

U.S. PATENT DOCUMENTS

| | | | |
|---|---|---|---|
| 3,757,332 A | 9/1973 | Tricoles | |
| 3,887,923 A | 6/1975 | Hendrix | |
| 4,150,382 A | 4/1979 | King | |
| 4,195,262 A | 3/1980 | King | |
| 4,229,745 A | 10/1980 | Kruger | |
| 4,291,312 A | 9/1981 | Kaloi | |
| 4,305,153 A | 12/1981 | King | |
| 4,489,325 A | 12/1984 | Bauck et al. | |
| 4,509,209 A | 4/1985 | Itoh et al. | |
| 4,701,762 A | 10/1987 | Apostolos | |
| 4,780,724 A | 10/1988 | Sharma et al. | |
| 4,832,429 A | 5/1989 | Nagler | |
| 4,947,176 A | 8/1990 | Inatsune et al. | |
| 5,455,590 A | 10/1995 | Collins et al. | |
| 5,734,347 A | 3/1998 | McEligot | |
| 5,841,543 A | 11/1998 | Guldi et al. | |
| 5,889,599 A | 3/1999 | Takemori | |
| 6,061,025 A | 5/2000 | Jackson et al. | |
| 6,198,453 B1 | 3/2001 | Chew | |
| 6,275,181 B1 | 8/2001 | Kitayoshi | |
| 6,313,803 B1 | 11/2001 | Manasson et al. | |
| 6,396,440 B1 | 5/2002 | Chen | |
| 6,469,672 B1 | 10/2002 | Marti-Canales et al. | |
| 6,545,645 B1 | 4/2003 | Wu | |
| 6,552,696 B1 | 4/2003 | Sievenpiper et al. | |
| 6,876,337 B2 | 4/2005 | Larry | |
| 6,985,107 B2 | 1/2006 | Anson et al. | |
| 7,162,250 B2 * | 1/2007 | Misra | H04W 16/08 455/445 |
| 7,295,146 B2 | 11/2007 | McMakin et al. | |
| 7,307,596 B1 | 12/2007 | West | |
| 7,428,230 B2 | 9/2008 | Park | |
| 7,834,795 B1 | 11/2010 | Dudgeon et al. | |
| 7,929,147 B1 | 4/2011 | Fong et al. | |
| 8,014,050 B2 | 9/2011 | McGrew | |
| 9,231,303 B2 | 1/2016 | Edelmann et al. | |
| 9,268,016 B2 | 2/2016 | Smith et al. | |
| 9,385,435 B2 | 7/2016 | Bily et al. | |
| 9,389,305 B2 | 7/2016 | Boufounos | |
| 9,450,310 B2 | 9/2016 | Bily et al. | |
| 9,634,736 B2 | 4/2017 | Mukherjee et al. | |
| 2002/0039083 A1 | 4/2002 | Taylor et al. | |
| 2004/0227668 A1 | 11/2004 | Sievenpiper | |
| 2006/0132369 A1 | 6/2006 | Robertson et al. | |
| 2006/0187126 A1 | 8/2006 | Sievenpiper | |
| 2007/0103381 A1 | 5/2007 | Upton | |
| 2007/0229357 A1 | 10/2007 | Zhang et al. | |
| 2008/0020231 A1 | 1/2008 | Yamada et al. | |
| 2008/0165079 A1 | 7/2008 | Smith et al. | |
| 2008/0224707 A1 | 9/2008 | Wisler et al. | |
| 2008/0259826 A1 | 10/2008 | Struhsaker | |
| 2009/0045772 A1 | 2/2009 | Cook et al. | |
| 2009/0147653 A1 | 6/2009 | Waldman et al. | |
| 2009/0284431 A1 | 11/2009 | Meharry et al. | |
| 2010/0079010 A1 | 4/2010 | Hyde et al. | |
| 2010/0109972 A2 | 5/2010 | Xu et al. | |
| 2010/0156573 A1 | 6/2010 | Smith et al. | |
| 2010/0157929 A1 | 6/2010 | Karabinis | |
| 2010/0188171 A1 | 7/2010 | Mohajer-Iravani et al. | |
| 2011/0065448 A1 * | 3/2011 | Song | H04B 7/0632 455/452.2 |
| 2011/0086598 A1 | 4/2011 | Ali et al. | |
| 2011/0098033 A1 | 4/2011 | Britz et al. | |
| 2011/0117836 A1 | 5/2011 | Zhang et al. | |
| 2011/0128714 A1 | 6/2011 | Terao et al. | |
| 2012/0038317 A1 | 2/2012 | Miyamoto et al. | |
| 2012/0112543 A1 | 5/2012 | van Wageningen et al. | |
| 2012/0194399 A1 | 8/2012 | Bily et al. | |
| 2012/0219249 A1 | 8/2012 | Pitwon | |
| 2012/0274147 A1 | 11/2012 | Stecher et al. | |
| 2012/0280770 A1 | 11/2012 | Abhari et al. | |
| 2012/0326660 A1 | 12/2012 | Lu et al. | |
| 2013/0082890 A1 | 4/2013 | Wang et al. | |
| 2013/0237272 A1 | 9/2013 | Prasad | |
| 2013/0278211 A1 | 10/2013 | Cook et al. | |
| 2013/0288617 A1 | 10/2013 | Kim et al. | |
| 2013/0324076 A1 * | 12/2013 | Harrang | H04W 28/08 455/405 |
| 2013/0343208 A1 | 12/2013 | Sexton et al. | |
| 2014/0128006 A1 | 5/2014 | Hu | |
| 2014/0266946 A1 | 9/2014 | Bily et al. | |
| 2015/0189568 A1 * | 7/2015 | Stanze | H04B 7/0417 370/331 |
| 2015/0280444 A1 | 10/2015 | Smith et al. | |
| 2017/0063344 A1 | 3/2017 | Broyde et al. | |
| 2017/0098961 A1 | 4/2017 | Harpham | |
| 2017/0250746 A1 * | 8/2017 | Wang | H04B 7/0617 |

FOREIGN PATENT DOCUMENTS

| | | |
|---|---|---|
| JP | 06-090110 | 3/1994 |
| JP | 2008054146 A | 3/2008 |
| JP | 2010147525 A | 7/2010 |
| JP | 2012085145 A | 4/2012 |
| WO | WO 01/73891 A1 | 10/2001 |
| WO | WO 2009/103042 | 8/2009 |
| WO | WO 2012/050614 A1 | 4/2012 |

OTHER PUBLICATIONS

Supplementary European Search Report, Pursuant to Rule 62 EPC; App. No. EP 14 87 2874; dated Jul. 3, 2017; pp. 1-15.
European Patent Office, Supplementary European Search Report, Pursuant to Rule 62 EPC; App. No. EP 15 80 8884; dated Jan. 9, 2018; pp. 1-12.
"Aperture", Definition of Aperture by Merriam-Webster; located at http://www.merriam-webster.com/dictionary/aperture; printed by Examiner on Nov. 30, 2016; pp. 1-9; Merriam-Webster, Incorporated.
PCT International Preliminary Report on Patentability; International App. No. PCT/US2014/070645; dated Jun. 21, 2016; pp. 1-12.
PCT International Search Report; International App. No. PCT/US2016/037667; dated Sep. 7, 2016; pp. 1-3.
European Search Report; European App. No. EP 11 832 873.1; dated Sep. 21, 2016; pp. 1-6.
Extended European Search Report; European App. No. EP 14 77 0686; dated Oct. 14, 2016; pp. 1-7.
The State Intellectual Property Office of P.R.C., Fifth Office Action, App. No. 2011/80055705.8 (Based on PCT Patent Application No. PCT/US2011/001755); dated Nov. 16, 2016; pp. 1-3 (machine translation, as provided).
Canadian Intellectual Property Office, Canadian Examination Search Report, Pursuant to Subsection 30(2); App. No. 2,814,635; dated Dec. 1, 2016; pp. 1-3.
European Patent Office, Supplementary European Search Report, Pursuant to Rule 62 EPC; App. No. EP 14891152; dated Jul. 20, 2017; pp. 1-4.
Ayob et al.; "A Survey of Surface Mount Device Placement Machine Optimisation: Machine Classification"; Computer Science Technical Report No. NOTTCS-TR-2005-8; Sep. 2005; pp. 1-34.
Japan Patent Office, Office Action, App. No. 2016-500314 (based on PCT Patent Application No. PCT/US2014/017454); dated Mar. 6, 2018; pp. 1-4.
Smith et al.; "Composite Medium with Simultaneously Negative Permeability and Permitivity"; Physical Review Letters; May 1, 2000; pp. 4184-4187; vol. 84, No. 18; American Physical Society.

(56) References Cited

OTHER PUBLICATIONS

European Patent Office, Communication Pursuant to Article 94(3) EPC; App. No. EP 14872874.4; dated Jul. 16, 2018; pp. 1-8.
European Patent Office, Communication Pursuant to Article 94(3) EPC; App. No. EP 14872595.5; dated Jul. 16, 2018; pp. 1-7.
Chinese State Intellectual Property Office, First Office Action, App. No. 201480074759.2 (based on PCT Patent Application No. PCT/US2014/069254); dated Jul. 2, 2018; pp. 1-14 (machine translation provided).
Chinese State Intellectual Property Office, First Office Action, App. No. 2015/80036356.3 (based on PCT Patent Application No. PCT/US2015/028781); dated Sep. 5, 2018; machine translation provided, 6 pages total.
Korean Intellectual Property Office, Notice of Preliminary Rejection; dated Oct. 15, 2018 (received by our Agent on Oct. 17, 2018, machine translation provided); pp. 1-5.
Chinese State Intellectual Property Office, Notification of the First Office Action, App. No. 201580042227.5 (based on PCT Patent Application No. PCT/US2015/036638); dated Sep. 30, 2018; (machine translation provided, 5 pages total).

\* cited by examiner

METHODS AND SYSTEMS FOR COMMUNICATION WITH BEAMFORMING ANTENNAS

CROSS-REFERENCE TO RELATED APPLICATIONS

The present application claims benefit of priority of U.S. Provisional Patent Application No. 62/175,933, entitled DYNAMIC ADJACENT CELL ASSIST FOR WIRELESS COMMUNICATIONS AND ADAPTIVE NETWORK CELLULAR BACKHAUL, naming ERIC BLACK, BRIAN DEUTSCH, ALEXANDER KATKO, MELROY MACHADO, JAY MCCANDLESS, AND YAROSLAV URZHUMOV as inventors, filed Jun. 15, 2015, which was filed within the twelve months preceding the filing date of the present application.

All subject matter of all of the above applications is incorporated herein by reference to the extent such subject matter is not inconsistent herewith.

BACKGROUND AND SUMMARY

Commercialized, low C-SWAP (Cost, Size, Weight and Power), software defined communications apertures will substantially increase network capacity in future wireless networks (e.g., 5G wireless networks). Embodiments of the present invention provide methods and systems that employ high gain, electronically steerable antennas for small cell radio access networks, backhaul, and millimeter wave applications. The steerable beam functionality may provide elevated data rates, reduced power consumption, spectrum reuse, and dynamic network reconfiguration. Additionally, network operating costs may be reduced and deployment schedules may become more flexible.

Future wireless network deployments (e.g., 5G wireless network deployments) are expected to offer increased data throughput over current deployments. From 2010 to 2020, industry expects mobile network traffic to increase by three orders of magnitude [1]. 5G wireless systems will incorporate a number of new technologies in order to meet the demands of spectrum crunch and energy consumption. Researchers and industry have proposed massive MIMO (multiple input multiple output) [2], cognitive radio [2], visible light communications [2], network densification [1], offloading [1], expanded and more efficient spectrum use [1], neighborhood small cells [3], millimeter wave backhaul [3], cloud radio access networks [3], coordinated multipoint processing [3] and native machine to machine support [4] as possible candidates for inclusion in 5G standards.

Presently, wide area or even omnidirectional antennas saturate spectrum due to their low directivity. Using low directivity antennas fundamentally leads to a higher energy cost per bit transmitted as the overwhelming majority of the radiated power is not captured by the receiving antenna unit. In addition, low directivity antennas spectrally pollute their coverage area, preventing similar antenna systems from operating simultaneously at the same frequency. Increasing network capacity then depends on moving to ever smaller cellular coverage areas to optimize the reuse of a carrier's very expensive spectrum.

Using high directivity antenna systems provides higher data rate per watt (due to SINR gains) by restricting the RF illuminated area. Spatial and angular diversity provide a potentially significant increase in the network throughput by maintaining good 'spectral hygiene' and not radiating energy in unneeded directions. This leaves the area free for spectrum reuse by other antennas, pushing the overall system back towards noise limited rather than interference limited. It is possible to use a massive arrangement of non-scanning, high directivity, fixed antennas to cover a region. However, a substantial number of fixed antennas would be needed to assure coverage, which would be expensive and bulky. Gimbal mounted antennas are another possible steering beam option. However, they are likely to be far too slow, bulky and expensive to address multiple users within the coverage area adequately.

In contrast to static antennas, electronically steered apertures can reconfigure the radiation pattern in short time intervals (e.g., microseconds) to best service the customers within the antenna's coverage area. Embodiments of present invention includes methods and systems that employ steerable antennas for high directivity and fast electronic beam switching which we refer to as Directivity on Demand (DoD). A DoD operating mode reduces the deployed tower site density by exploiting the antenna's increased coverage range. Even for short range links, operators concerned about base station power consumption may find substantial energy savings when using high directivity antennas in addition to providing extended battery life for user equipment [5].

Adjacent cell towers can coexist using Inter-Cell Interference Coordination (ICIC) techniques to assure their beams act cooperatively and not interfere. Multipath noise is reduced as the physical channel is not distributed in unneeded directions. Non-line-of-sight (NLoS) communications could scan the beam to locate effective channels. Nomadic hotspots such as trains and ships can be served with a high gain link from a steered beam antenna. With sufficiently low cost steerable antennas, MIMO support can be enabled with separate apertures (or multiple feeds for one aperture) to achieve orthogonal space division multiplexing (OSDM).

Software defined apertures (SDAs) have been realized by Active Electronically Steered Arrays (AESAs) for decades [6]. AESAs have frustrated many attempts to reduce their cost, size, weight and power (C-SWAP) and continue to see almost exclusive use in the military domain. Despite the C-SWAP limitations, a number of groups have proposed phased array based solutions for next generation networking [3] [7] [8] [9].

Embodiments of the present invention utilize an alternative scanning beam technology that leverages surface scattering techniques to achieve robust beamforming. In antennas based on surface scattering techniques, coupling between a guided wave and propagating wave is achieved by modulating the electromagnetic properties of a surface in electromagnetic contact with the guided wave. This controlled surface modulation may be referred to as a "modulation pattern" or a "hologram pattern." The guided wave in the antenna may be referred to as a "reference wave" or "reference mode" and the desired free space propagating wave pattern may be referred to as the "radiative wave" or "radiative mode."

Surface scattering antennas are described, for example, in U.S. Patent Application Publication No. 2012/0194399 (hereinafter "Bily I"), with improved surface scattering antennas being further described in U.S. Patent Application Publication No. 2014/0266946 (hereinafter "Bily II"). Surface scattering antennas that include a waveguide coupled to adjustable scattering elements loaded with lumped devices are described in U.S. Patent Application Publication No. 2015/0318618 (hereinafter "Chen I"), while various holographic modulation pattern approaches are described in U.S. Patent Application Publication No. 2015/0372389 (hereinafter "Chen II"). Surface scattering antennas that include a waveguide coupled to adjustable slot elements are described in U.S. Patent Application Publication No. 2015/0380828 (hereinafter "Black I"). Curved or conformal surface scattering antennas are described in U.S. Patent Application Publication No. 2015/0318620 (hereinafter "Black II"). Broadband surface scattering antennas are described in U.S. Patent Application No. 62/271,524 (hereinafter "Black III"). All of these patent applications are herein incorporated by reference in their entirety, and shall be collectively referred to hereinafter as the "MSAT applications."

Because surface scattering antennas utilize a holographic principle of controlled scattering of a reference wave off of a hologram defined by the antenna modulation pattern, surface scattering antennas will be equivalently and interchangeably described as "holographic beamforming antennas" through this specification. Whenever embodiments contemplate a beamforming antenna, it is contemplated that the beamforming antenna can be a holographic beamforming antenna or surface scattering antenna such as any of those disclosed in the above MSAT applications; and whenever embodiments contemplate configuring or adjusting a beamforming antenna, it is contemplated that the antenna can be configured or adjusted as disclosed as in any of the above MSAT applications.

Surface scattering antennas have been demonstrated to operate over a wide range of microwave and mmW frequencies, including frequency ranges from L band to V band (1-60 GHz). Surface scattering antennas can be rapidly reconfigured (e.g. in microseconds) to steer a beam in arbitrary directions or form different beam shapes in software (see, e.g., Chen II). Some approaches leverage traditional circuit manufacturing technologies for low cost and power consumption. Surface scattering antennas do not require discrete phase shifters or custom monolithic microwave integrated circuits (MMICs) but can instead leverage commercial off the shelf components developed for high volume production by the wireless industry. Unlike an AESA, a surface scattering antenna does not require distributed amplification and cooling, and this can substantially reduce the size, weight, complexity and power consumption for embodiments of the present invention.

Embodiments utilize surface scattering antennas that can be made conformal (see, e.g., Black II) to support more discrete deployment locations in municipalities that have stringent aesthetic requirements for antenna installations. In some embodiments the antenna profile thickness is as low as ½ inch (12.7 mm) which allows deployment in a variety of locations without disturbing the appearance of the host structure. It has been noted that spatial densification is likely to require this kind of low cost, low profile and conformable technology for discrete deployments [3].

Steerable high directivity antennas result in greater spectral reuse to minimize interference. For example, replacing a low directivity antenna on a small cell with a holographic beamforming antenna, while keeping a low directivity antenna on the UE, enhances the link margin compared to a link where both antennas have low directivity. The increased gain of a holographic beamforming antenna allows the UE to decrease its transmission power for UE while maintaining a good margin, increasing UE battery life and decreasing interference with other devices.

In much the same way that the advent of MIMO caused a redesign of the wireless protocol stack, so too will the use of SDAs for highly directive spatial channelization. No longer will the antenna be relegated to the less sophisticated PHY layer as traditionally has been the case. "Dumb" antennas were static elements and not used as an additional tool to increase throughput, spectral efficiency or range. SDAs represent the last dynamic piece of a fully software defined radio system and as such, will need a reshaped wireless protocol stack to inform the network on how best to take advantage of this new capability.

Some embodiments provide for using holographic beamforming antennas for adaptive routing within communications networks, such as wireless backhaul networks. For example, in future 5G networks, wireless backhaul will be employed to connect small cells. The small cells are unlikely to have dedicated fiber or wired links due to the predicted density of their deployment. These links will likely need beam steering for dynamic routing around obstacles and maintaining link performance in the presence of pole sway.

Further embodiments provide for using holographic beamforming antennas for discovering and/or addressing nodes in a communication network with steerable, high-directivity beams. For example, in future 5G networks, the macro cell, small cell and UE will be simultaneously engaged with each other, a concept which has been discussed as the heterogeneous network (HetNet) [11]. Both backhaul networks and radio access networks (RANs) may utilize high directivity beam steering and millimeter wave connectivity to end users to provide greatly expanded channel capacity.

Still further embodiments provide for using beamforming antennas to extend the range of communications nodes and to provide bandwidth assistance to adjacent communications nodes via dynamic adjacent cell assist (DACA). For example, in future 5G networks, small cells may be employed within the coverage area of a macrocell to divide the coverage into ever smaller subunits. Embodiments could reduce the number of needed small cells through Dynamic Adjacent Cell Assist (DACA).

Still further embodiments provide for using MIMO in concert with holographic beamforming for additional channel capacity. MIMO is enhanced by use of coordinated holographic beamforming antennas. The channel capacity of directed-beam MIMO scales linearly with the number of antennas and logarithmically with antenna gain. Networks can simultaneously utilize both MIMO and DoD (Directivity on Demand via holographic beamforming) to maximize channel capacity.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
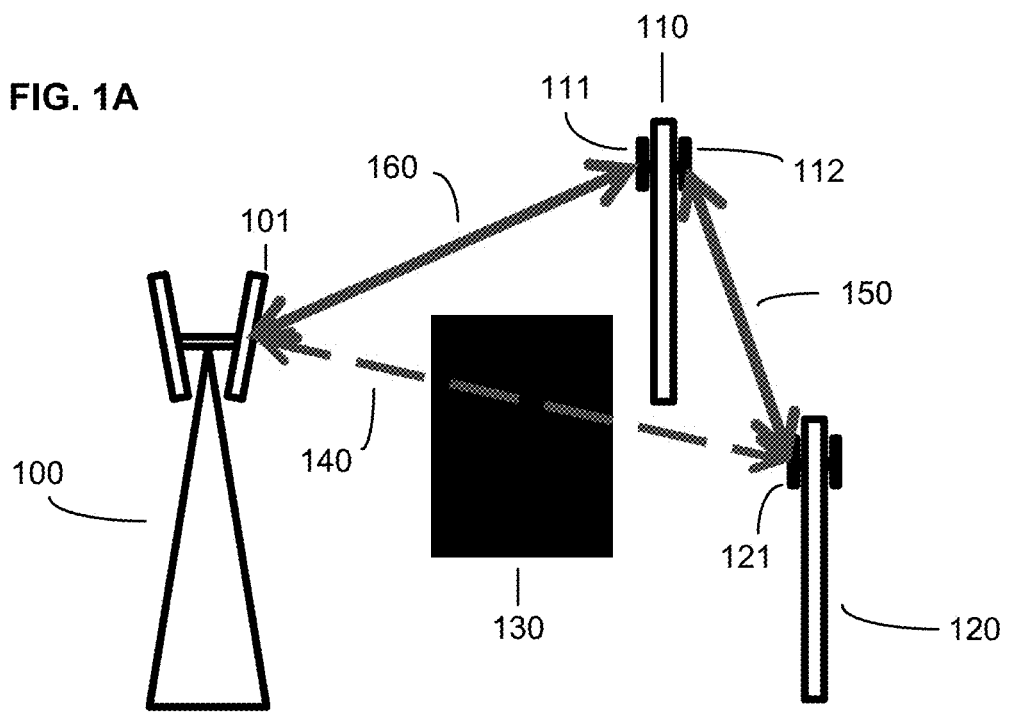
FIG. 1A depicts a scenario for adaptive routing within a communications network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

With reference to FIG. 1A, an illustrative scenario is depicted for adaptive routing within a communications network. The illustrative network includes three nodes 100, 110, and 120. The node 100 is depicted as a macro cell node and the nodes 110 and 120 are depicted as small cell nodes, but this depiction is not intended to be limiting; in various embodiments, each of the various nodes can be selected from a list of node types that includes macro cell nodes, small cell nodes (including nano, pico, and femto cells), other base station or access point nodes, and user equipment nodes. In some embodiments the communications network is a wireless mesh network that includes one or more root nodes and one or more mesh nodes: the root nodes are nodes having a high speed connection (such as a fiber or other wired connection) to a communications backbone, while the mesh nodes lack such a high speed connection and are instead connected to the communications backbone via wireless paths that can include zero, one, or more intermediate mesh nodes. Thus, FIG. 1A depicts an example network that includes one root node (the macro cell node 100) and two mesh nodes (small cells 110 and 120).

In the illustrative scenario of FIG. 1A, communications node 100 includes at least one beamforming antenna 101, communications node 110 includes at least two beamforming antennas 111 and 112, and communications node 120 includes at least one beamforming antenna 121. The beamforming antennas establish communications channels 140, 150, and 160 between the nodes; in the illustrative example of FIG. 1A, these are backhaul channels, but one or more of the channels can be a RAN channel, e.g. when it connects to a UE node The illustration contemplates a dynamic rerouting of the network when an obstacle 130 obstructs a communications channel 140 between node 100 and node 120. In view of the obstacle 130, the node 120 reconfigures its beamforming antenna to direct a beam not along the blocked communications channel 140, but instead along the open communications channel 150, i.e. to direct a beam at the node 110.

The obstacle 130 is depicted as a physical obstacle that obstructs the communications channel 140; more generally, the node 120 receives information indicating a preference to reroute from node 100 to node 110 and steers its beamforming antenna 121 accordingly. The rerouting preference can occur when there is physical interference with the communications channel (e.g. rain fade, a passing vehicle); when there is electromagnetic interference with the communications channel (e.g. the presence of a nearby source of noise or spectrum interference); or when there is a bandwidth constraint at the other end of the communications channel (e.g. at outage or shortage at the adjacent node or an outage or shortage for a wireless path between the adjacent node and a root node).

In some approaches, the node 120 receives the information indicating a rerouting preference directly via monitoring of communications channel 140. For example, the power received from the adjacent node may drop off; or the node may observe a decrease in SINR (signal-to-interference-plus-noise ratio) or CINR (carrier-to-interference-plus-noise ratio) for the communications channel; or the node may observe channel state information indicating a reduced channel quality. In other approaches, the node 120 receives the information indicating the rerouting preference indirectly. For example, the node may receive an outage indication from the network, or the node may receive an instruction to reroute to another adjacent node from the network. The node might receive this indication from the network as control data that is communicated along one or more of the existing communications channels 140, 150, 160, or the node might receive this information from the network via a complementary or subsidiary network. For example, the node might be also equipped with a supplemental wireless network module such as a WLAN, WiMAX, 2G, 3G, 4G/LTE, FM or Bluetooth module, and this supplemental network module might receive the outage indication or the instruction to reroute. In some approaches, the instruction to reroute might originate at a network operations center (NOC). For example, a network operations center might reconfigure the network to respond to outages or to provide surge capacity for high traffic situations such as sporting events, disasters, or rush hour commuting.

Figure 1B:
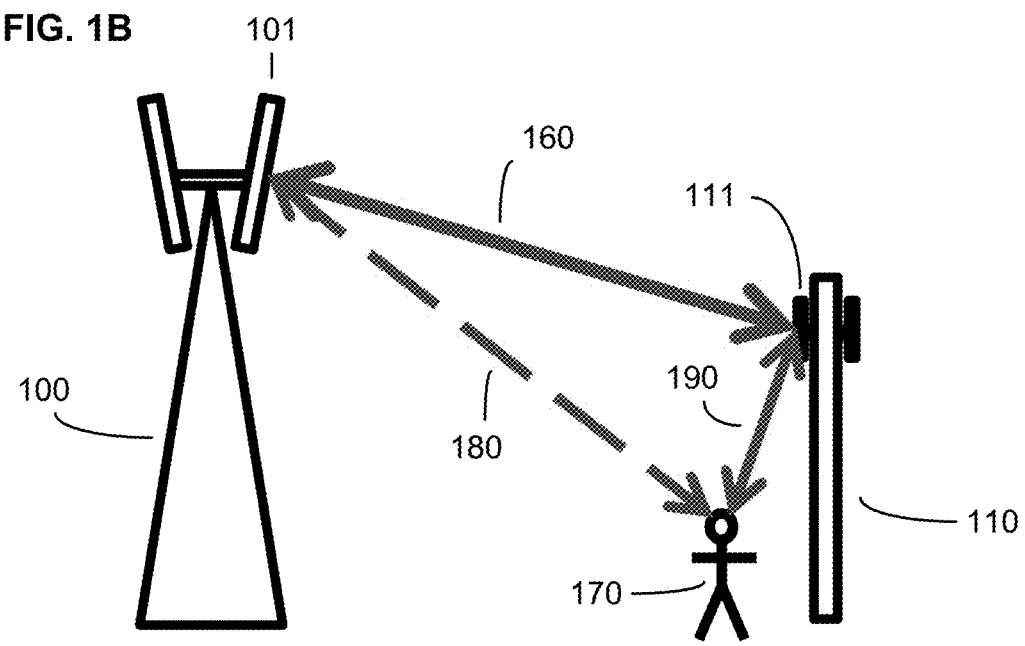
FIG. 1B depicts a scenario for high directivity beam connectivity within a communications network.

With reference to FIG. 1B, an illustrative scenario is depicted for discovering and/or addressing nodes for both backhaul and RAN in a communication network. The illustrative network includes three nodes 100, 110, and 170. The node 100 is depicted as a macro cell node, the node 110 is depicted as small cell node, and the node 170 is depicted as a user equipment node, but this depiction is not intended to be limiting; in various embodiments, each of the various nodes can be selected from a list of node types that includes macro cell nodes, small cell nodes (including nano, pico, and femto cells), other base station or access point nodes, and user equipment nodes.

In the illustrative scenario of FIG. 1B, a virtual communications channel 180 between the node 100 and the node 170 is accomplished with the combination of a first high directivity channel 190 between node 170 and node 110 (e.g. a RAN channel to a UE node) and a high directivity channel 160 between node 110 and node 100 (e.g. a backhaul channel to the macro cell). The use of high directivity channels entails systems and methods for discovering locations of adjacent nodes and then selecting beam configurations for the antennas that define the high directivity channels. For example, the node 100 might be equipped to discover the location of the node 110 and then configure the beamforming antenna 101 to direct a high directivity beam at the node 110 to establish the backhaul communications channel 160; and the node 110 might be equipped to configure to discover the location of the node 170 and then configure the beamforming antenna 110 to direct a high directivity beam at the node 170 to establish a RAN channel 190.

In some approaches, the high-directivity backhaul and RAN channels are millimeter-wave channels. One of the key limitations of moving from 4G to 5G systems is the spectrum crunch. As demand for mobile data increases, there is seemingly never enough spectrum available. One key enabler for 5G systems is the expected use of millimeter-wave (mmW) frequencies, at multiple levels of the network (including potentially backhaul, fronthaul and RAN). The bands at mmW frequencies offer very large blocks of contiguous bandwidth: a frequency domain multiplexing system utilizing the lightly licensed E-band, for example, could potentially utilize 5 GHz of spectrum each for transmit and receive. Other candidate bands include 28 GHz, 39 GHz, and the unlicensed 60 GHz bands, offering up to GHz of available bandwidth and they are under consideration for RAN in 5G systems (including by the FCC [13]). As examples, the 28 GHz band (licensed in the United States for local multipoint distribution service), and the 39 GHz band (licensed for fixed point-to-point operation), are heavily underutilized. There has been a variety of recent work examining the suitability of these bands for 5G RAN; including studying the possibility of current 39 GHz fixed service and mobile 5G coexistence [14]. Proof-of-concept demonstrations have also shown the suitability of using phased array antennas at 28 GHz for base stations [15].

Two major limitations of state-of-the-art mmW technology are the increased Friis transmission loss and low available output power of current devices [3]. The large and unrestricted bandwidth at 60 GHz, for example, is hindered by the high path loss due to oxygen absorption. Moreover, commercially available mmW amplifiers offer output power of only 1 W with low efficiency at many bands.

Both of these limitations result in significantly lower link margin for a given system. However, significant increases in margin can be provided by the use of high directivity antennas. For mmW frequencies, very high gain antennas can be realized in small physical areas. As an example, at 60 GHz and E-band frequencies, antennas with over 30 dBi of gain can be realized in areas under one square foot, providing significantly higher gain than existing 4G antennas in a small footprint. The expected dense deployment of small cells may entail large numbers of low-cost, high-gain antennas in locations where municipalities may balk at large dish antennas. Thus, antennas with low profile, low weight, and low power consumption will be crucial to realize mmW-based networks.

Using mmW frequencies for RAN makes the use of beamforming antennas even more crucial. The gain needed to overcome the limitations noted above will require the use of highly directive antennas rather than omnidirectional antennas, while also retaining the ability to switch the beam direction or even width to offer sufficient coverage of UEs on an as-needed basis. Holographic beamforming antennas provide the necessary flexibility to switch between many UEs on a per-frame or even per-packet basis while offering such DoD.

Returning to the illustrative scenario of FIG. 1B, embodiments entail operating a communications node (such as macro cell node 100 or small cell node 110) that includes a holographic beamforming antenna (such as antenna 101 or antenna 111, respectively) to discover an adjacent node (such as small cell node 110 or user equipment node 170, respectively) and to configure the holographic beamforming antenna to point a high directivity beam at the adjacent node (e.g. along the high directivity backhaul channel 160 or the high directivity RAN channel 190, respectively).

The discovery of the adjacent node may include adjusting the holographic beamforming antenna to provide a sequence of search beam patterns. The sequence of search beam patterns may be used to call and receive a reply from the adjacent node (e.g. where the adjacent node is configured to periodically listen for and respond to a call signal), or the sequence of search beam patterns may be used to simply listen for a beacon signal from the adjacent node (e.g. where the adjacent node is configured to periodically broadcast a beacon signal). In some approaches, the sequence of search patterns is a scan sequence of search patterns; for example, the antenna may be adjusted to scan a narrow fan beam through a range of azimuthal angles to determine the (azimuthal) location of the adjacent node, or the antenna may scan a narrow pencil beam through a range of both azimuthal and altitudinal angles to determine the (azimuthal and altitudinal) location of the adjacent node. In other approaches, the sequence of search patterns is a sequence of random search patterns; for example, the antenna may be adjusted to step through a sequence of narrow fan or pencil beams having random azimuthal and/or altitudinal angles, or the antenna may be adjusted to step through a sequence of random, low-directivity, substantially orthogonal beams that substantially fill a search area. In the former scheme, the random sequence continues until the adjacent neighbor is discovered; in the latter scheme, the corresponding sequence of signals from the adjacent node can be used to make a statistical estimate of the location of the adjacent node, according to a compressive sensing algorithm such as those described in U.S. Patent Application Publication No. 2013/0335256, herein incorporated by reference. In yet other approaches, the sequence of search beam patterns includes progressively narrower search beams that narrow in on the location of the adjacent node. For example, the sequence of search beam patterns may include a first scan of very broad beams to discover a general location of the adjacent node, then a second scan of narrower beams to discover a more precise location of the adjacent node, and so on as needed. An example of such a progressively narrowing search is a binary search (or more generally, an N-ary search) that explores a sequence of fractional recursive subdivisions of an initial search area.

While in some approaches the discovery proceeds without any initial information about the location of the adjacent node, in other approaches the discovery proceeds with initial information about an approximate location of the adjacent node. For example, the node may receive information about an approximate location of the adjacent node, such as physical coordinates (e.g. GPS coordinates) of the adjacent node. The node might receive the approximate location information from the network as control data that is communicated along one or more existing communications channels (e.g. with previously discovered nodes), or the node might receive this information from the network via a complementary or subsidiary network. For example, the node might be also equipped with a supplemental wireless network module such as a WLAN, WiMAX, 2G, 3G, 4G/LTE, FM or Bluetooth module, and this supplemental network module might receive the approximate location information. In some approaches, the approximate location information might originate at a network operations center (NOC). In some approaches, the node is further equipped to obtain information about its own physical coordinates and orientation, e.g. from one or more sensors located at the node (these could include a GPS sensor, a magnetometer, an accelerometer, and/or a gyroscope). Thus, the node could combine information about the physical coordinates of the adjacent node with information about physical coordinates and orientation of the instant node to identify a search area in which to search for the adjacent node. For example, the node could identify a search area that encompasses degrees of uncertainty about the physical coordinates of the adjacent node and physical coordinates and orientation of the instant node. Then, the node could proceed with a search sequence such as those described in the previous paragraph, except that the search sequence is limited to search beams that explore the identified search area.

While the discovery approaches set forth above describe discovery of a single adjacent node, the approaches are equally suitable to discover a plurality of adjacent nodes. Supposing that a communication node has discovered a plurality of adjacent nodes, one approach for communicating with the plurality of adjacent nodes is to repeatedly switch the holographic beamforming antenna to point a repeated sequence of high directivity beams at the plurality of adjacent nodes (this is a time division multiplexing approach). In a time division multiplexing approach, the holographic beamforming antenna can be switched, e.g., on a per-packet basis or on a per-frame basis. Another approach is to equip the node with a plurality of holographic beamforming antennas. If the plurality of holographic beamforming antennas is less than the plurality of discovered adjacent nodes, some switching (time division multiplexing) would still be needed to communicate with all of the discovered adjacent nodes. If the plurality of holographic beamforming antennas is equal to the plurality of discovered adjacent nodes, each of the beamforming antennas can be dedicated to a respective adjacent node. If the plurality of holographic beamforming antennas is greater than the plurality of discovered adjacent nodes, multiple beamforming antennas can be dedicated to selected adjacent nodes and communication with the selected adjacent nodes can benefit from MIMO channel capacity enhancement, as further discussed below.

Figure 1C:
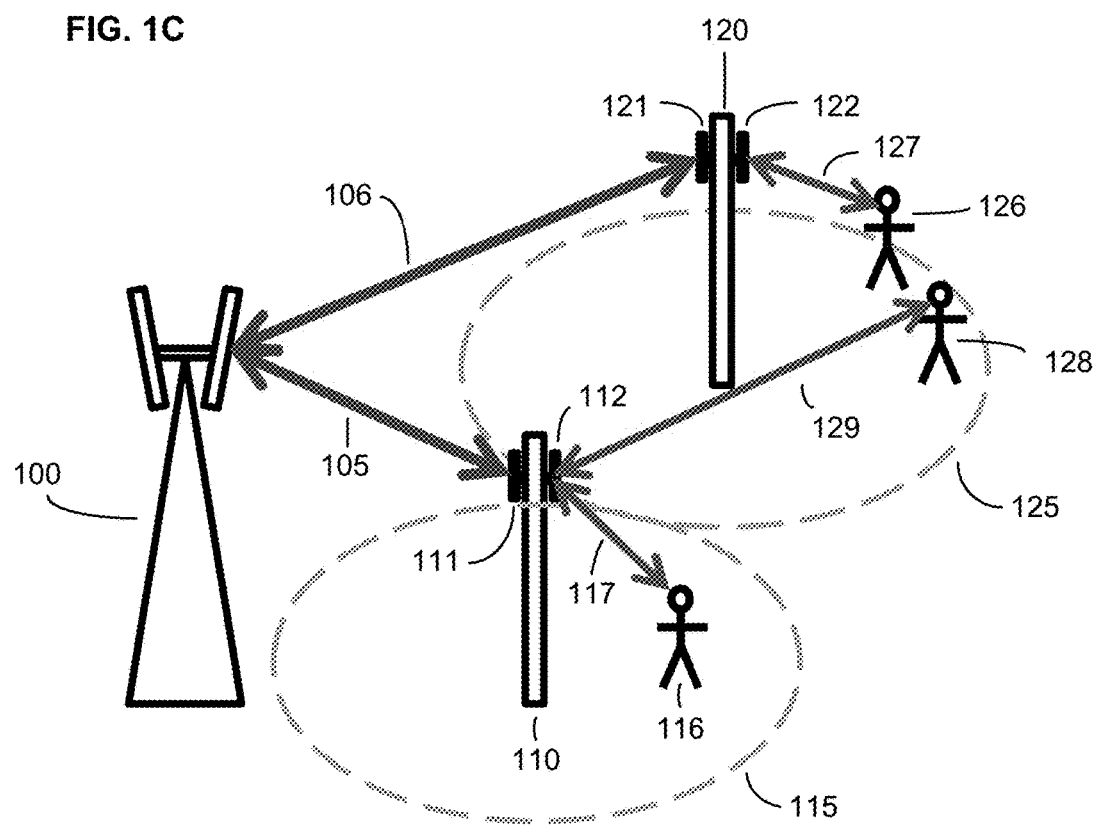
FIG. 1C depicts a scenario for dynamic adjacent cell assist within a communications network.

With reference to FIG. 1C, an illustrative scenario is depicted for dynamic adjacent cell assist within a communications network. The illustrative network includes three nodes 100, 110, and 120. The node 100 is depicted as a macro cell node and the nodes 110 and 120 are depicted as small cell nodes, but this depiction is not intended to be limiting; in various embodiments, each of the various nodes can be selected from a list of node types that includes macro cell nodes, small cell nodes (including nano, pico, and femto cells), other base station or access point nodes, and user equipment nodes.

The illustration of FIG. 1C includes a macro cell 100 having backhaul channels 105, 106 to small cells 110, 120 respectively. These backhaul connections could be high directivity, possibly millimeter wave, connections that are made using beamforming antennas according to the approaches set forth above. Thus, the nodes 110 and 120 may include backhaul antennas 111 and 121 configured to point high directivity beams along the backhaul channels 105 and 106, respectively, and to transmit or receive backhaul data along these backhaul channels, perhaps in a mmW frequency band; and these backhaul antennas may be implemented as holographic beamforming antennas.

Meanwhile, the nodes 110 and 120 also include respective antennas 112 and 122 to provide communications service to user equipment in respective cellular coverage areas 115 and 125. In a traditional cellular deployment, a user 116 in a first coverage area 115 would receive service via a communications channel 117 with the antenna 112 serving that first coverage area, whereas a user 126 in a second coverage area 125 would receive service via a communications channel 127 with the antenna 122 serving that second coverage area. However, embodiments of the present invention equip the node 110 with a holographic beamforming antenna 112 that can provide dynamic adjacent cell assistance by providing a communications channel 129 for a distant user 128 outside the traditional coverage area 115 of the node 110. Thus, embodiments entail configuring a holographic beamforming antenna (such as antenna 112) to direct a first beam (e.g., 117) at a local user (e.g., 116), and then, responsive to receiving information indicating a bandwidth shortage at an adjacent node (e.g., 120), reconfiguring the beamforming antenna to direct a second beam (e.g., 129) at a distant user (e.g., 128).

In some approaches, the antennas 112 and 122 may provide millimeter-wave RAN service to the user equipment in the coverage areas, whereas in other approaches, the antennas 112 and 122 provide lower frequency RAN service to the user equipment, e.g. at lower frequency bands appropriate for various 3G, 4G, and 5G RAN protocols.

In some approaches, the beamforming antenna may use a relatively low directivity beam 117 to local address users 116 within a local coverage area 115, and a relatively high directivity beam 129 to address distant users 128 within an adjacent coverage area 125. The relatively low directivity beam might encompass a set of local users; for example, the low directivity beam might address an entire sector of the coverage area 115 in approaches where each cellular coverage area is divided into sectors. Meanwhile, the relatively high directivity beam 129 might have a greater range by virtue of its higher directivity, thus allowing the beamforming antenna 112 to extend its range into the adjacent coverage area 125 to address distant users. In other approaches, high directivity beams may be used to address both local users and distant users.

In some approaches, a node receives information indicating a bandwidth shortage at an adjacent node via a network that includes the instant node and the adjacent node. For example, in the illustrative scenario of FIG. 1C, the node 110 might receive information indicating a bandwidth shortage at adjacent node 120 via a communication along the backhaul channel 105. As another example, the node might receive the bandwidth shortage indication from the network via a complementary or subsidiary network. Thus, the node might be also equipped with a supplemental wireless network module such as a WLAN, WiMAX, 2G, 3G, 4G/LTE, FM or Bluetooth module, and this supplemental network module might receive the bandwidth shortage indication. In some approaches, the bandwidth shortage indication might originate at a network operations center (NOC).

Figure 2A:
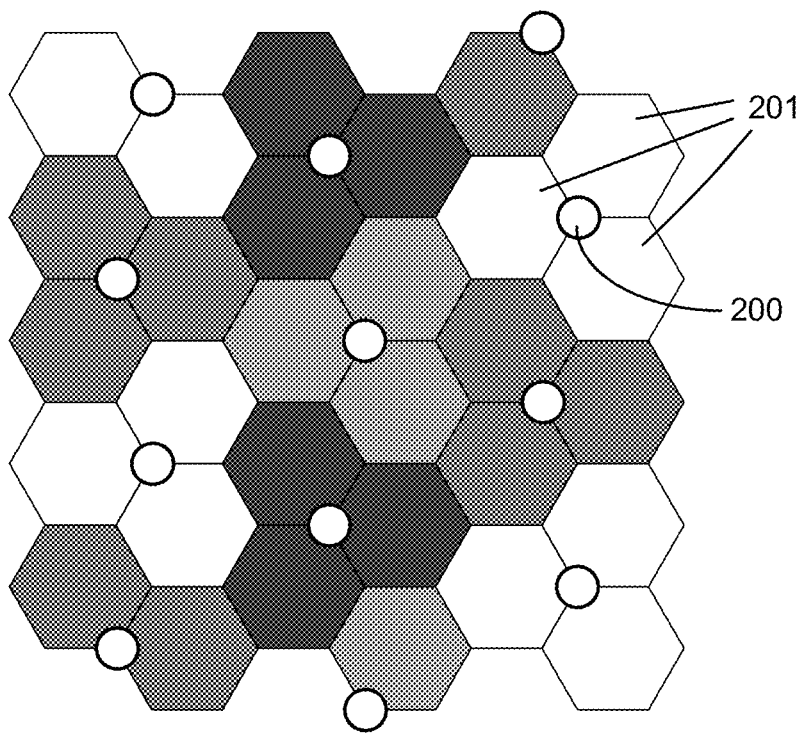
FIG. 2A depicts a cell deployment.

With reference now to FIGS. 2A-2D, an illustrative cell deployment scenario is depicted. FIG. 2A depicts an idealized traditional coverage layout where each small cell (or macrocell) station 200 covers three adjacent sectors 201 using static beam antennas. In the illustrative scenario, each static antenna has a gain of 14 dB and covers a 120° arc. The station spacing may be optimized to assure complete coverage while minimizing adjacent site interference. Inter-Cell Interference Coordination (ICIC) is employed to handle the boundaries between adjacent cells.

Figure 2B:
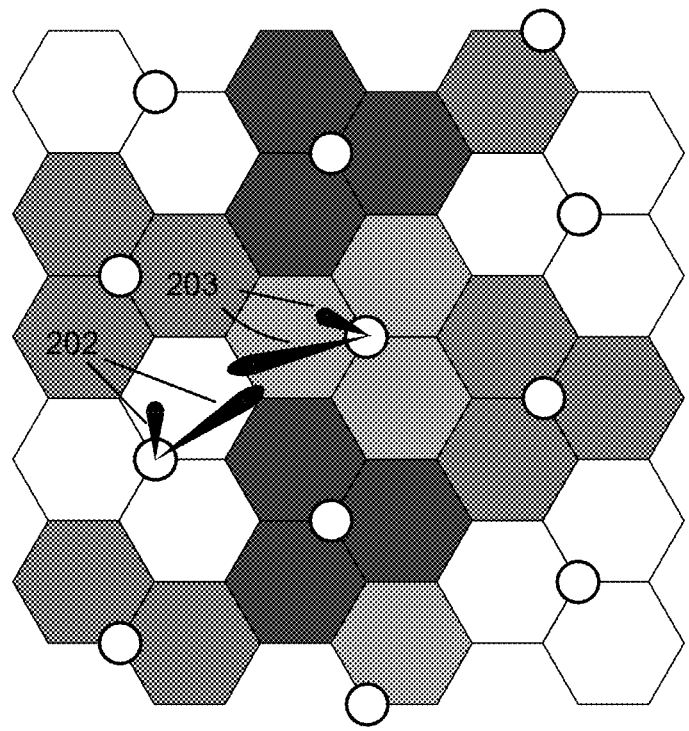
FIG. 2B depicts a cell deployment with multiple beamforming antennas.

In FIG. 2B, the traditional static antenna addressing each cell sector 201 is replaced by a plurality of beamforming antennas. This allows a plurality (e.g. 202, 203) of simultaneous, independent beams from a single base site to serve a given cell's coverage area using the same carrier frequency.

Figure 2C:
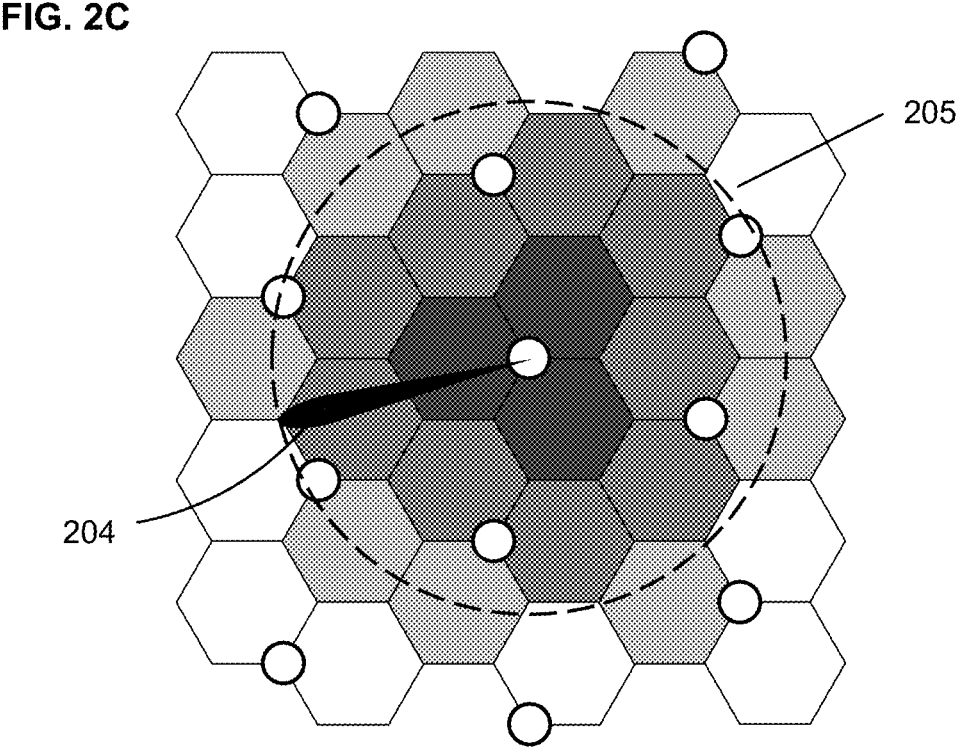
FIG. 2C depicts a cell deployment with a range-extending beamforming antenna.

In FIG. 2C, the traditional static antenna has been replaced with a beamforming antenna capable of forming a higher gain beam 204 (for example, providing a gain of 24 dB with a beam width of 5°). The narrower beam can provide advantages of higher signal power, reduced interference, reduced noise and full coverage for its traditional area of responsibility by rapid beam switching (space division multiple access). Moreover, the narrower beam has an extended range 205 that extends into the traditional coverage areas of the adjacent base stations.

Figure 2D:
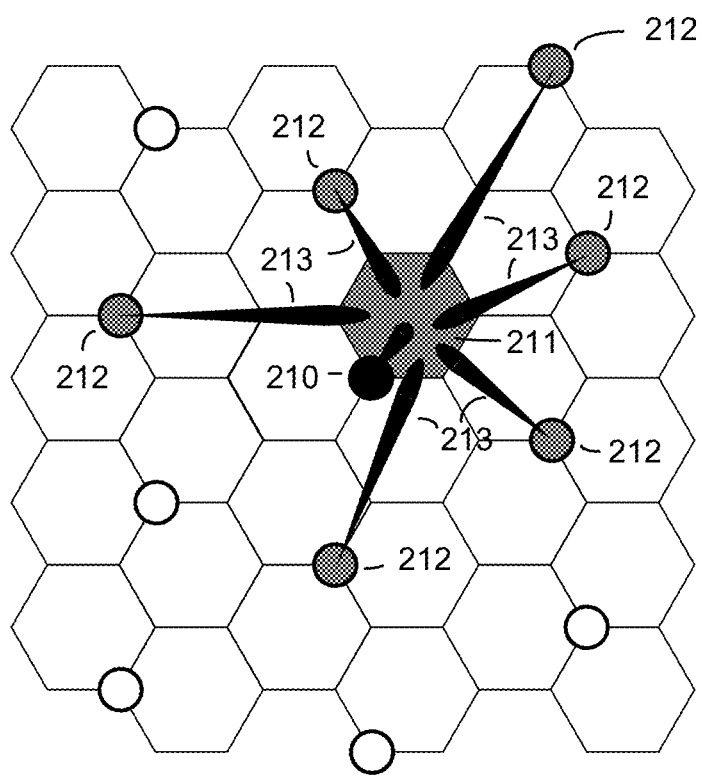
FIG. 2D depicts a cell deployment with dynamic adjacent cell assist.

In FIG. 2D, a dynamic adjacent cell assist scenario is depicted wherein a single base station 210 has been overwhelmed by a transient demand for data bandwidth by users within coverage area 211 served by the base station 210. In this scenario, nearby base stations 212 that have spare bandwidth can cooperatively assist the primary station 210 by pointing high directivity beams 213 at the coverage area 211, maximizing spatial spectrum reuse. Beamforming antennas operating in this Dynamic Adjacent Cell Assist (DACA) mode may reduce the number of small cells needed as the network densifies. This may be especially useful in areas where very high bandwidth demands only happen with low frequency where it makes little economic sense to deploy a static extra node to cover an extreme case.

Figure 3:
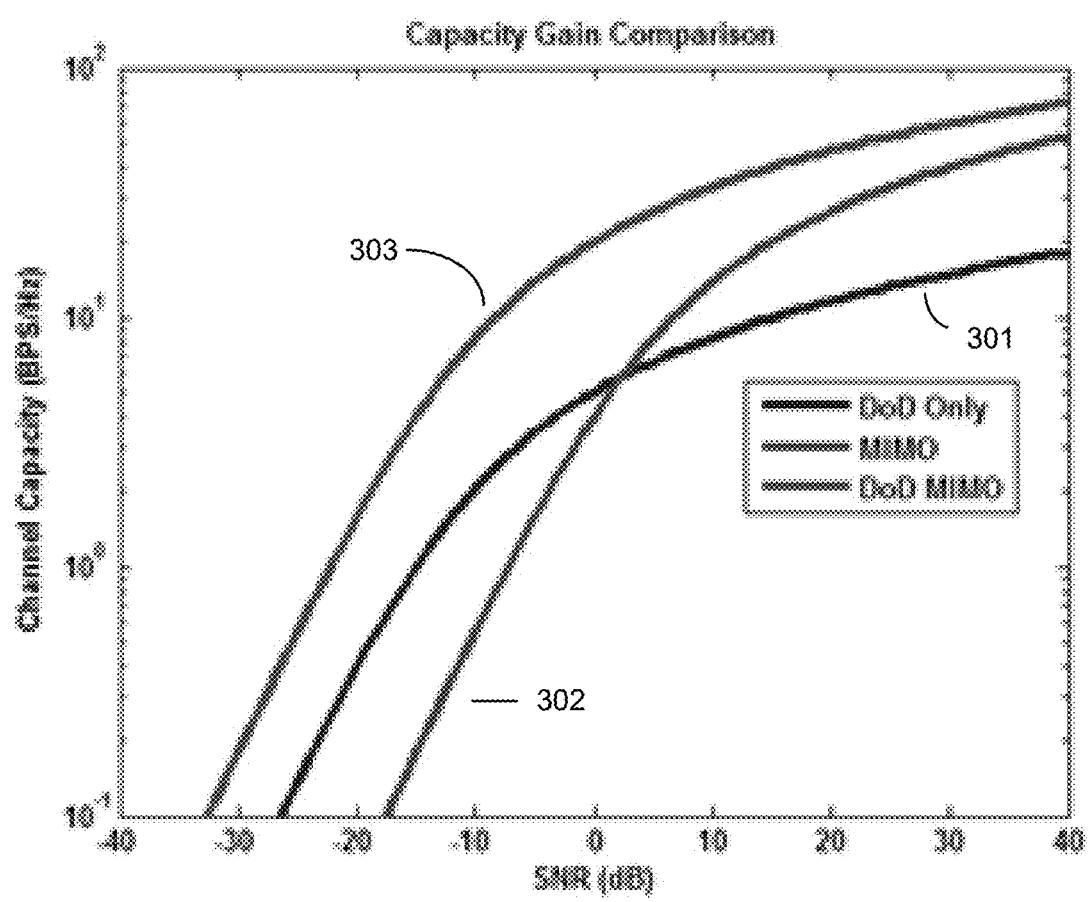
FIG. 3 depicts a plot of channel capacity.

Some embodiments provide for using MIMO in concert with holographic beamforming for additional channel capacity. Beamforming combined with MIMO can result in substantial capacity gains [16]. For a traditional non-directive MIMO system the channel capacity scales as $$C_{MIMO} \approx p \log_2(1+\text{SNR}),$$

where p is the number of MIMO channels and SNR is the intrinsic signal to noise ratio with no directive antenna gain. The channel capacity scales linearly whereas directive beamforming alone scales as $$C_{DoD} \approx \log_2(1+\text{SNR} \cdot G),$$

where G is the additional beamforming gain of the directive antenna. The best of both techniques are combined in beamforming MIMO where the channel capacity scales as $$C_{DoD+MIMO} \approx p \log_2(1+\text{SNR} \cdot G),$$

resulting in significant channel capacity enhancement. FIG. 3 depicts an example comparing these channel capacities for the case where p=4 (4-channel MIMO) and G=15 dB. It can be seen that DoD alone (301) is helpful in low SNR environments (as will be the case for many millimeter wave systems) but in high SNR situations MIMO (302) is superior. However, DoD enhanced MIMO (303) dominates in all SNR situations.

In some approaches, a MIMO enhancement of channel capacity may be implemented by using multiple feeds for a holographic beamforming antenna. Thus, for every embodiment that contemplates a holographic beamforming antenna, the holographic beamforming antenna can include a plurality of RF feed ports addressed by a respective plurality of RF transmitters or receivers. Then the respective plurality of RF transmitters or receivers can be addressed with MIMO multiplexing and/or demultiplexing circuitry to provide a corresponding plurality of MIMO channels.

In other approaches, a MIMO enhancement of channel capacity may be implemented by using multiple holographic beamforming antennas. Thus, for every embodiment that contemplates a holographic beamforming antenna, the holographic beamforming antenna can be replaced with a plurality of holographic beamforming antennas addressed by a respective plurality of RF transmitters or receivers. Then the respective plurality of RF transmitters or receivers can be addressed with MIMO multiplexing and/or demultiplexing circuitry to provide a corresponding plurality of MIMO channels.

Figure 4:
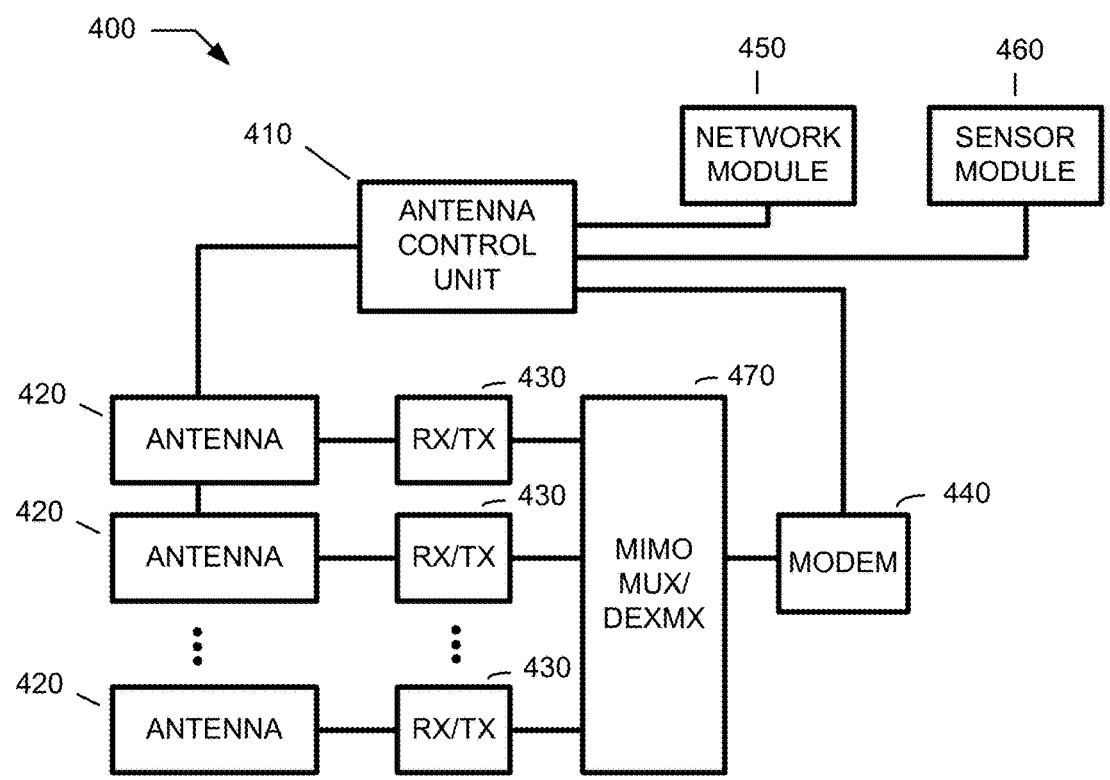
FIG. 4 depicts a system block diagram.

With reference now to FIG. 4, an illustrative embodiment is depicted as a system block diagram. The system 400 includes an antenna control unit 410 that includes circuitry for adjusting control inputs of one or more holographic beamforming antennas 420. The system optionally includes the one or more holographic beamforming antennas 420 (in some embodiments, the system omits the one or more holographic beamforming antennas 420 and is instead configured for later connection to the one or more holographic beamforming antennas).

The antenna control unit 410 can include circuitry for adjusting control inputs of the one or more holographic beamforming antennas according to any of the embodiments set forth above. For example, the antenna control unit can include: circuitry for receiving information indicating a rerouting preference and reconfiguring a holographic beamforming antenna according to the rerouting preference; circuitry for discovering an adjacent node (e.g. with a plurality of search beams) and pointing a high directivity beam at the discovered adjacent node; and/or circuitry for receiving information indicating an adjacent node bandwidth shortage and reconfiguring a holographic beamforming antenna to assist the adjacent node.

The system 400 optionally includes one or more transmitters, receivers, or transceivers 430 connected or connectable to feed ports of the respective holographic beamforming antennas 420. The system optionally includes a modem 440 coupled to the one or more transmitters, receivers, or transceivers 430. The modem can be configured to provide information to the antenna control unit 410 so that the antenna control unit can carry out is beamforming and beam-steering functions. For example, the modem can be configured to report reply signals from an adjacent node when the antenna control unit is seeking to discover adjacent nodes. As another example, the modem can be configured to report information about an approximate location of the adjacent node when the antenna control unit is seeking to discover adjacent nodes. As another example, the modem can be configured to report information indicating a rerouting preference. As another example, the modem can be configured to report information indicating a bandwidth shortage at an adjacent node. As another example, the modem can be configured to report a frame rate or packet rate so that the antenna control unit can switch the one or more holographic beamforming antennas at the reported frame rate or packet rate.

The system 400 optionally includes a supplementary wireless network module 450 configured to provide information to the antenna control unit 410 so that the antenna control unit can carry out its beamforming and beam-steering functions. For example, the network module can be configured to report information about an approximate location of the adjacent node when the antenna control unit is seeking to discover adjacent nodes. As another example, the network module can be configured to report information indicating a rerouting preference. As another example, the network module can be configured to report information indicating a bandwidth shortage at an adjacent node. The network module can include, for example, a WLAN, WiMAX, 2G, 3G, 4G/LTE, FM or Bluetooth network module.

The system 400 optionally includes a sensor module 460 that includes one or more of a GPS sensor, a magnetometer (compass), an accelerometer, and/or a gyroscope. The sensor module can be configured to report information about physical coordinates and/or physical orientation of a communication node to assist the antenna control unit in discovering adjacent nodes.

The system 400 optionally includes MIMO multiplexing and/or demultiplexing circuitry 470 to provide for MIMO utilization of multiple RF channels.

CITED REFERENCES

[1] P. K. Agyapong, M. Iwamura, D. Staehle, W. Kiess and A. Benjebbour, "Design Considerations for a 5G Network Architecture," IEEE Commun. Mag., vol. 52, no. 11, pp. 65-75, November 2014.

[2] C.-X. Wang, F. Haider, X. Gao, Y. Yang, D. Yuan, H. Aggoune, H. Haas, S. Fletcher and E. Hepsaydir, "Cellular Architecture and Key Technologies for 5G Wireless Communication Networks," IEEE Commun. Mag., vol. 52, no. 2, pp. 122-130, February 2014.

[3] N. Bhushan, J. Li, D. Malladi, R. Gilmore, D. Brenner, A. Damnjanovic, R. T. Sukhavasi, C. Patel and S. Geirhofer, "Network Densification: The Dominant Theme for Wireless Evolution into 5G," IEEE Commun. Mag., vol. 52, no. 2, pp. 82-89, February 2014.

[4] F. Boccardi, R. W. Heath, A. Lozano, T. L. Marzetta and P. Popovski, "Five Disruptive Technology Directions for 5G," IEEE Commun. Mag., vol. 52, no. 2, pp. 74-80, February 2014.

[5] C. Han, I. Krikidis, T. Harrold, S. Videv, P. M. Grant, H. Haas, J. Thompson, I. Ku, C.-X. Wang, T. Anh Le, M. Nakhai, J. Zhang and L. Hanzo, "Green Radio: Radio Techniques to Enable Energy Efficient Wireless Networks," IEEE Commun. Mag., vol. 49, no. 6, pp. 46-54, June 2011.

[6] R. C. Hansen, Phased Array Antennas, Hoboken: John Wiley and Sons, 2009.

[7] Nokia, "This is how 5G networks will follow their users," Nokia, 29 Apr. 2015. [Online]. Available: https://blog.networks.nokia.com/mobile-networks/2015/04/29/11043/. [Accessed 8 Jun. 2015].

[8] A. Capone, I. Filippini and V. Sciancalepore, "Context Information for Fast Cell Discovery in mm-wave 5G Networks," in The 21st European Wireless Conference, Budapest, 2015.

[9] A. Sadri, "Millimeter Wave Capable Small Cells with Modular Antenna Arrays for Next Generation Wireless Systems," Connect World, 2015. [Online]. Available: http://www.connect-world.com/index.php/magazines/europe/item/25780-millimeter-wave-capable-small-cells-with-modular-antenna-arrays-for-next-generation-wireless-systems. [Accessed 8 Jun. 2015].

[10] S. Ebadi, T. Driscoll and D. Smith, "Visual Illustrations of Microwave Holographic Beamforming using a Modulated Surface-Impedance Metamaterial," in Antennas and Propagation Society International Symposium, Orlando, 2013.

[11] J. Andrews, "Seven Ways that HetNets Are a Cellular Paradigm Shift," IEEE Commun. Mag., vol. 51, no. 3, pp. 136-144, 2013.

[12] US Federal Communications Commision, FCC 05-45: Allocations and Service Rules for the 71-76 GHz, 81-86 GHz and 92-95 GHz bands, Washington D.C.: US Gov, 2005.

[13] "NOI to examine use of bands above 24 GHz for mobile broadband," Federal Communications Commission, FCC 14-154, October 2014.

[14] J. Kim, L. Xian, A. Maltsev, R. Arefi and A. S. Sadri, "Study of Coexistence between 5G Small-Cell Systems and Systems of the Fixed Service at 39 GHz Band," in International Microwave Symposium, 2015.

[15] F. Aryanfar, J. Pi, H. Zhou, T. Henige, G. Xu, S. Abu-Surra, D. Psychoudakis and F. Khan, "Millimeter-Wave Base Station for Mobile Broadband Communication," in Internation Microwave Symposium, 2015.

[16] J. Brady, N. Behdad and A. Sayeed, "Beamspace MIMO for Millimeter-Wave Communications: System Architecture, Modeling, Analysis, and Measurements," IEEE Trans on Ant and Prop, vol. 61, no. 7, pp. 3814-3827, 2013.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of operating a first node that includes a holographic beamforming antenna to dynamically assist a second node, comprising:
configuring the holographic beamforming antenna to direct a first beam at a local user located closer to the first node than the second node;
receiving information indicating a bandwidth shortage at the second node; and
responsive to the receiving, reconfiguring the holographic beamforming antenna to direct a second beam at a distant user located closer to the second node than the first node.

2. The method of claim 1, wherein the first beam has a first directivity and the second beam has a second directivity greater than the first directivity.

3. The method of claim 1, wherein the first node is a first base station serving a first cell that encloses the local user and the second node is a second base station serving a second cell that encloses the distant user.

4. The method of claim 3, wherein the second cell is adjacent to the first cell.

5. The method of claim 3, wherein the first cell includes a first sector that encloses the local user and the first beam has a first beamwidth less than or equal to an angle subtended at the first node by the first sector.

6. The method of claim 5, wherein the second cell includes a second sector that encloses the distant user and the second beam has a second beamwidth less than or equal to an angle subtended at the first node by the second sector.

7. The method of claim 1, wherein the configuring and the reconfiguring comprise a repeated switching of the beamforming antenna between at least the first beam and the second beam.

8. The method of claim 7, wherein the repeated switching includes:
increasing a duty cycle of the first beam responsive to an increased bandwidth demand of the local user or a decreased bandwidth demand of the distant user.

9. The method of claim 7, wherein the repeated switching includes:
increasing a duty cycle of the second beam responsive to an increased bandwidth demand of the distant user or a decreased bandwidth demand of the local user.

10. The method of claim 7, wherein the local user is one of a plurality of local users, the first beam is one of a set of one or more first beams directed at the plurality of local users, and the repeated switching includes:
repeatedly switching the beamforming antenna between at least the set of one or more first beams and the second beam.

11. The method of claim 10, wherein the set of one or more first beams is a plurality of first beams respectively corresponding to the plurality of local users.

12. The method of claim 7, wherein the distant user is one of a plurality of distant users, the second beam is one of a set of one or more second beams directed at the plurality of distant users, and the repeated switching includes:
repeatedly switching the beamforming antenna between at least the first beam and the set of one or more second beams.

13. The method of claim 12, wherein the set of one or more second beams is a plurality of second beams respectively corresponding to the plurality of distant users.

14. The method of claim 1, wherein the receiving of the information indicating the bandwidth shortage is a receiving of the information from a network operations center.

15. The method of claim 1, wherein the receiving of the information indicating the bandwidth shortage is a receiving of the information via a network that includes the first node and the second node.

16. The method of claim 15, wherein the network is a subsidiary network.

17. The method of claim 16, wherein the subsidiary network is a WLAN, WiMAX, 2G, 3G, 4G/LTE, FM, or Bluetooth network.

18. The method of claim 1, wherein the holographic beamforming antenna includes a waveguide and a plurality of radiative elements coupled to the waveguide with inter-element spacings substantially less than one-half of a free-space wavelength corresponding to an operating frequency of the antenna, and the configuring or the reconfiguring includes:
adjusting a respective plurality of couplings between the radiative elements and the waveguide.

19. The method of claim 1, wherein the holographic beamforming antenna includes a waveguide and a plurality of radiative elements coupled to the waveguide with inter-element spacings substantially less than one-half of a free-space wavelength corresponding to an operating frequency of the antenna, and the configuring or the reconfiguring includes:
adjusting a respective plurality of resonant frequencies of the radiative elements.

20. A system for operating a first node that includes a beamforming antenna to dynamically assist a second node, comprising:
an antenna control unit that includes circuitry for adjusting control inputs of the beamforming antenna to direct a first beam at a local user located closer to the first node than the second node;
where the antenna control unit further includes circuitry for receiving information indicating a bandwidth shortage at the second node and readjusting the control inputs the beamforming antenna to direct a second beam at a distant user located closer to the second node than the first node; and
wherein the beamforming antenna is a holographic beamforming antenna.

21. The system of claim 20, further comprising:
the beamforming antenna.

22. The system of claim 20, wherein the first beam has a first directivity and the second beam has a second directivity greater than the first directivity.

23. The system of claim 20, wherein the first node is a first base station serving a first cell that encloses the local user and the second node is a second base station serving a second cell that encloses the distant user.

24. The system of claim 23, wherein the second cell is adjacent to the first cell.

25. The system of claim 23, wherein the first cell includes a first sector that encloses the local user and the first beam has a first beamwidth less than or equal to an angle subtended at the first node by the first sector.

26. The system of claim 25, wherein the second cell includes a second sector that encloses the distant user and the second beam has a second beamwidth less than or equal to an angle subtended at the first node by the second sector.

27. The system of claim 20, wherein the circuitry for adjusting and readjusting includes circuitry for repeatedly adjusting the control inputs of the beamforming antenna to switch the beamforming antenna between at least the first beam and the second beam.

28. The system of claim 27, wherein the circuitry for repeatedly adjusting the control inputs includes circuitry for increasing a duty cycle of the first beam responsive to an increased bandwidth demand of the local user or a decreased bandwidth demand of the distant user.

29. The system of claim 27, wherein the circuitry for repeatedly adjusting the control inputs includes circuitry for increasing a duty cycle of the second beam responsive to an increased bandwidth demand of the distant user or a decreased bandwidth demand of the local user.

30. The system of claim 27, wherein the local user is one of a plurality of local users, the first beam is one of a set of one or more first beams directed at the plurality of local users, and the circuitry for repeatedly adjusting the control inputs includes:
circuitry for repeatedly adjusting the control inputs of the beamforming antenna to switch between at least the set of one or more first beams and the second beam.

31. The system of claim 30, wherein the set of one or more first beams is a plurality of first beams respectively corresponding to the plurality of local users.

32. The system of claim 27, wherein the distant user is one of a plurality of distant users, the second beam is one of a set of one or more second beams directed at the plurality of distant users, and the circuitry for repeatedly adjusting the control inputs includes:
circuitry for repeatedly adjusting the beamforming antenna to switch between at least the first beam and the set of one or more second beams.

33. The system of claim 32, wherein the set of one or more second beams is a plurality of second beams respectively corresponding to the plurality of distant users.

34. The system of claim 20, further comprising:
a network module configured to receive the information indicating the bandwidth shortage from a network that includes the first node and the second node.

35. The system of claim 34, wherein the network module is configured to receive the information indicating the bandwidth shortage from a network operations center.

36. The system of claim 34, wherein the network module is a subsidiary network module.

37. The system of claim 36, wherein the subsidiary network module is a WLAN, WiMAX, 2G, 3G, 4G/LTE, FM, or Bluetooth network module.

38. The system of claim 20, wherein the holographic beamforming antenna includes a waveguide and a plurality of radiative elements adjustably coupled to the waveguide with inter-element spacings substantially less than one-half of a free-space wavelength corresponding to an operating frequency of the antenna.

39. The system of claim 20, wherein the holographic beamforming antenna includes a waveguide and a plurality of radiative elements having adjustable resonant frequencies and coupled to the waveguide with inter-element spacings substantially less than one-half of a free-space wavelength corresponding to an operating frequency of the antenna.

* * * * *